United States Patent [19]

Guest

[11] Patent Number: 5,683,121
[45] Date of Patent: Nov. 4, 1997

[54] TUBE COUPLING COLLETS HAVING EMBEDDED METAL SKELETON

[76] Inventor: John D. Guest, 'Iona', Cannon Hill Way, Bray, Maidenhead, Berkshire, United Kingdom

[21] Appl. No.: 531,255

[22] Filed: Sep. 20, 1995

[30] Foreign Application Priority Data

Sep. 21, 1994 [GB] United Kingdom ............. 9419003

[51] Int. Cl.$^6$ ............................................. F16L 21/06
[52] U.S. Cl. ....................... 285/322; 285/308; 285/319
[58] Field of Search ................................. 285/308, 322, 285/323, 319, 243, 104

[56] References Cited

U.S. PATENT DOCUMENTS

| 2,479,058 | 8/1949 | Botting | 285/104 |
|---|---|---|---|
| 3,453,006 | 7/1969 | Levake | 285/104 |
| 3,653,689 | 4/1972 | Sapy et al. | 285/308 |
| 4,005,883 | 2/1977 | Guest | 285/322 |
| 4,178,023 | 12/1979 | Guest | 285/323 |
| 4,805,932 | 2/1989 | Imhof et al. | 285/104 |
| 5,029,908 | 7/1991 | Belisaine | 285/323 |

FOREIGN PATENT DOCUMENTS

| 378035 | 7/1990 | European Pat. Off. | 285/322 |
|---|---|---|---|
| 427306 | 5/1991 | European Pat. Off. | 285/322 |
| 3508198 | 9/1986 | Germany | 285/322 |
| 618723 | 3/1961 | Italy | 285/104 |
| 275991 | 11/1989 | Japan | 285/308 |
| 4249695 | 9/1992 | Japan | 285/308 |
| 1270648 | 4/1972 | United Kingdom. | |

*Primary Examiner*—Eric K. Nicholson
*Attorney, Agent, or Firm*—Baker & Daniels

[57] ABSTRACT

The disclosure relates to a tube coupling collet for holding a tube in a tapered bore in a coupling body. The collet comprises a plastics molding having an annular head with a plurality of resilient arms extending axially from the head. A metal skeleton is embodied in the plastics molding comprising an annular element molded in the annular head of the collet and integral legs extending axially from the annular element within the resilient arms of the collet.

3 Claims, 3 Drawing Sheets

AFTER PLASTIC COLLET EROSION

TUBE COUPLING COLLETS HAVING EMBEDDED METAL SKELETON

BACKGROUND OF THE INVENTION

1. Field of the Invention

This invention relates to tube coupling collets for holding tubes in tapered bores in a coupling body.

2. Description of the Prior Art

Reference should be made to U.S. patent application Ser. No. 08/372,591 and U.S. Pat. No. 5,443,289 for examples of such tube couplings.

Such tube couplings are formed in both metals and plastics. In the case where plastics materials are used, there is a risk that chemical attack or fire could partially or completely destroy the plastics material and in that event, the tube will almost certainly be released from the coupling with the consequential risk of loss of fluid or gas.

SUMMARY OF THE INVENTION

This invention provides a tube coupling collet for holding a tube in a tapered bore in a coupling body, the collet comprising a plastics moulding having an annular head with a plurality of resilient arms extending axially from the head and a metal skeleton embodied in the plastics moulding comprising an annular element moulded into the annular head and integral legs extending axially from the annular element within the resilient arms of the collet.

Preferably, the ends of the collet arms remote from the annular head are formed with integral inturned teeth to engage with a tube in the collet and the ends of the metal skeleton legs within the ends of the plastic arms are inturned extending to the inner edges of the teeth to bite into the surface of the tube.

Each collet arm may be connected to the annular collet head by spaced hinge elements and the legs of the metal skeleton may be likewise connected to the annular portion of the skeleton by spaced metal bridging elements embodied in the hinge elements of the plastics arms.

DESCRIPTION OF THE PREFERRED EMBODIMENT

Figure 1:
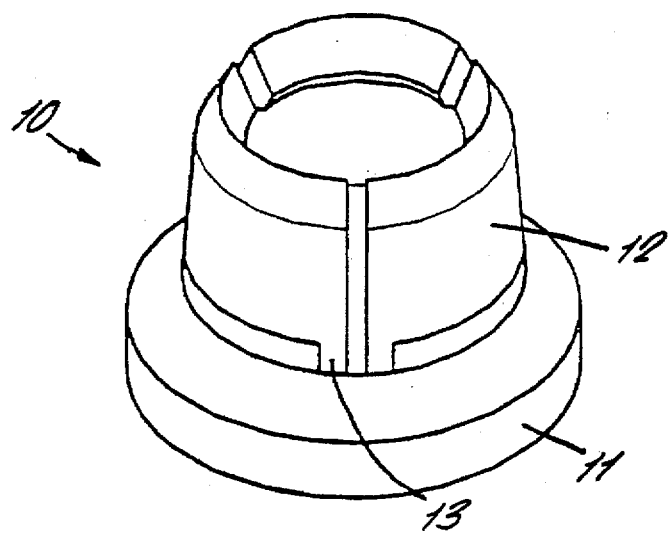
FIG. 1 is a perspective view of a tube coupling collet embodying a metal skeleton in accordance with the invention.
Figure 2:
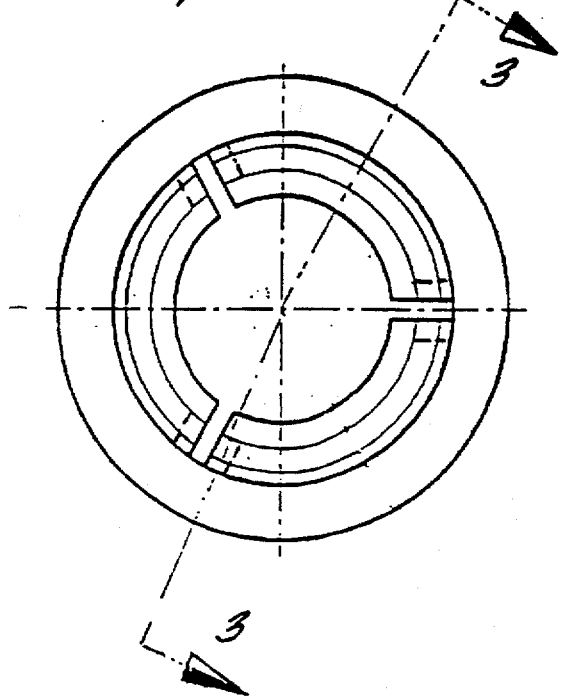
FIG. 2 is an end view of the collet, as shown in FIG. 1.
Figure 3:
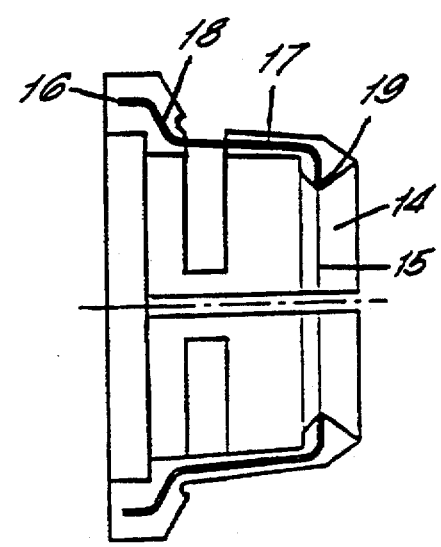
FIG. 3 is a section on the line 3—3 on FIG. 2.

Referring firstly to FIGS. 1 to 3 of the drawings, there is shown a collet indicated generally at 10 for holding a tube in a tapered bore in a coupling body. The collet is formed as a plastics moulding and comprises an annular head 11 having three spaced arcuate section arms 12 projecting from the head. The arms are formed integrally with the head and are connected thereto by narrow hinge elements 13 at the edges of the arm.

As best seen in FIG. 3, the end of each arm remote from the annular head 11 is formed with an integral inturned tooth 14 which tapers to an edge 15 to engage the surface of a tube to be held in the collet.

The plastics collet is moulded with a metal, for example steel, skeleton embodied in the collet, comprising an annulus 16 moulded in the plastics head 11 and resilient arms 17 extending to the collet arms. The legs 17 are connected to the annular portion of the skeleton by narrow resilient bridging portions 18 embodied in the hinged portions 13 of the arms 12.

At the outer ends of the arms, the ends of the skeleton legs are turned inwardly through the inwardly projecting teeth 14 to the inner edges of the teeth 15 to reinforce the edges of the teeth which bite into the surface of the tube extending to the collet.

Figure 4:
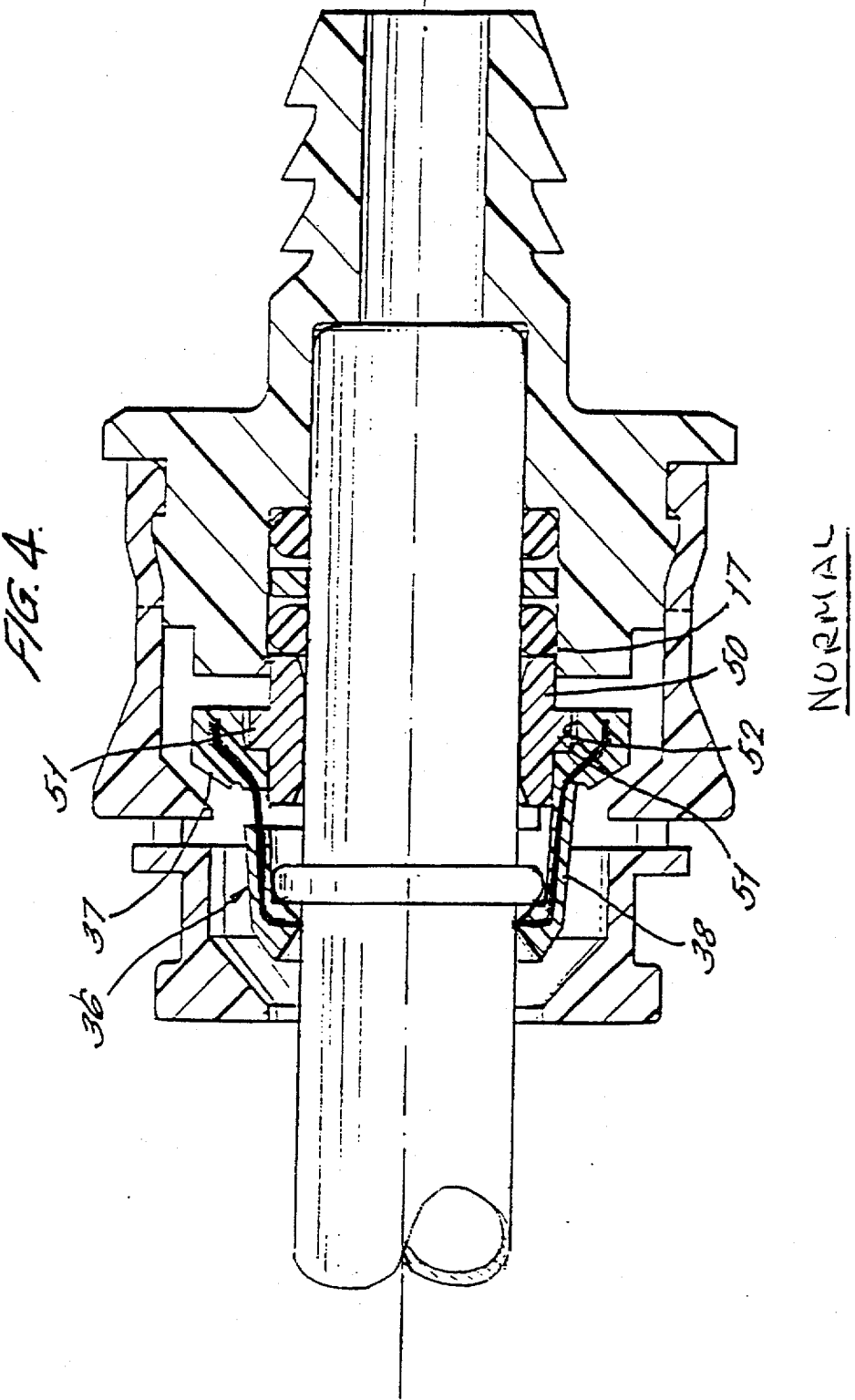
FIG. 4 is a sectional view of a collet in accordance with the invention embodied in a tube coupling body and holding a tube in place.

FIG. 4 of the drawings shows a collet of the form described and illustrated above embodied in a tube coupling as described and illustrated in European Patent publication No. 0 597 711.

Figure 5:
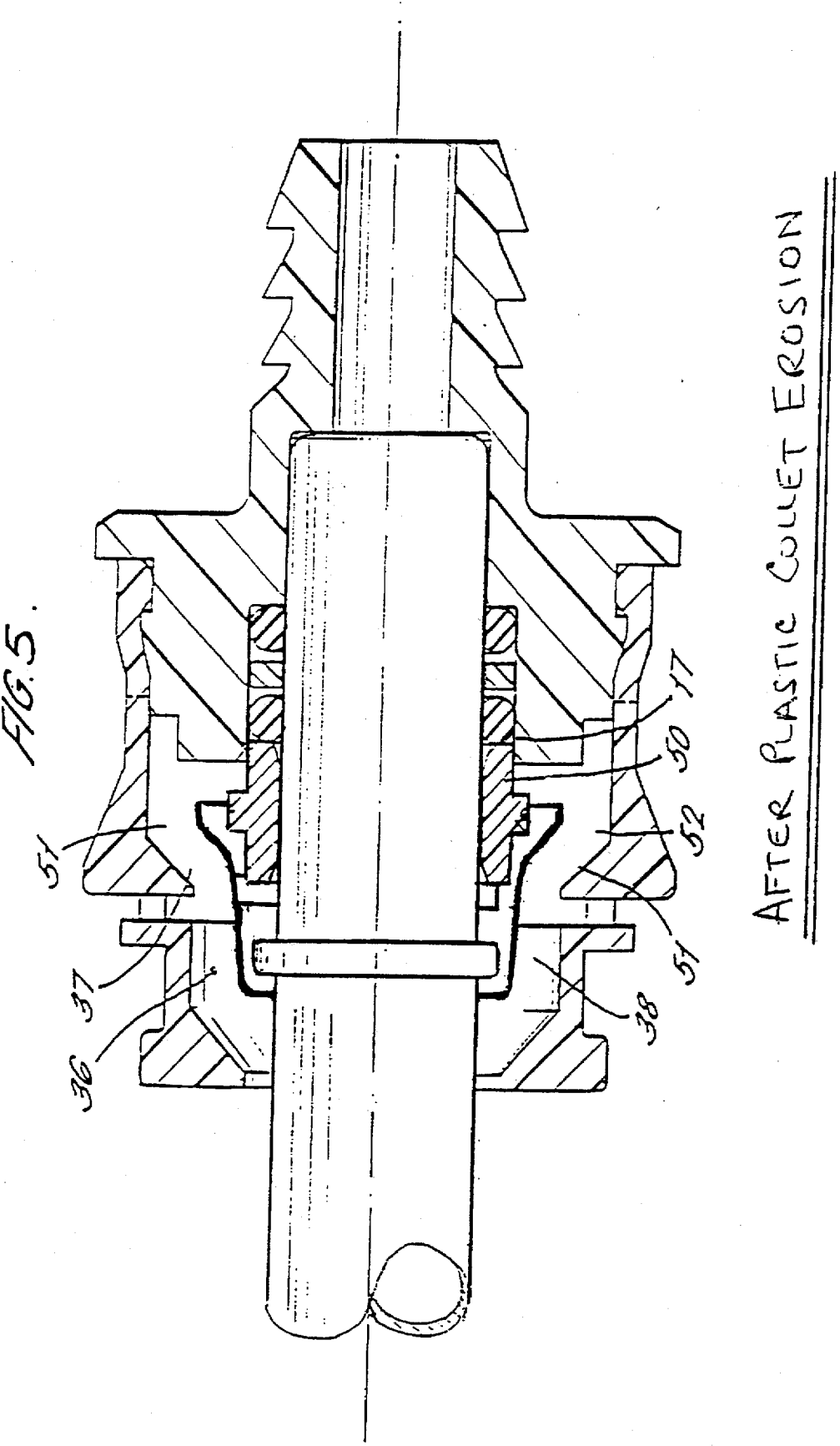
FIG. 5 is a similar view to FIG. 4 showing the collet after the collet has been subjected to attack by chemicals or excess heat.

Should the collet be subject to fire or chemical attack, the plastics material of the collet may be destroyed but the metal skeleton may survive and will continue to hold the tube in the coupling body, as illustrated in FIG. 5. Also the metal skeleton will indicate whether the pipe was correctly assembled into the collet and fitting prior to the damage.

I claim:

1. A tube coupling collet for holding a tube in a tapered bore in a coupling body, the collet comprising a plastics molding having an annular head with a plurality of resilient arms extending axially from the head and having distal ends for engaging a tube within the collet, a metal skeleton embedded in the plastics moulding, said metal skeleton comprising an annular element moulded in said annular head and a plurality of integral legs connected to said annular element and extending axially from the annular element and disposed within said resilient arms.

2. A tube coupling collet as claimed in claim 1, wherein said distal ends include integral inturned teeth with inner edges to engage with a said tube located in the collet and wherein the ends of said integral legs are inturned and extend to said inner edges of the teeth to bite into the surface of the said tube.

3. A tube coupling collet as claimed in claim 1, wherein each collet arm is connected to the annular head by spaced integral hinge elements and wherein the integral legs are connected to the annular element by spaced metal bridging elements embedded in the resilient arms.

* * * * *